United States Patent Office 2,976,214
Patented Mar. 21, 1961

2,976,214

SEALING COAT FOR TABLETS AND SIMILAR ARTICLES

Tadao Ida, Gose-shi, Nara-ken, Japan, assignor to Tanabe Seiyaku Co., Ltd., Osaka, Japan No Drawing. Filed June 22, 1959, Ser. No. 821,635

2 Claims. (Cl. 167—82)

This invention relates to a sealing coat for tablets and similar articles to protect their contents, and to the articles sealed with the coat. It is known to give a sealing coat to compressed tablets to protect their contents from moisture before the tablets are covered with a plurality of coatings of sugar syrup to which powdered filler is added during the intermediate drying after the application of each coating. A sealing coat is also required when tablets are coated with a water-soluble film-forming material such as gelatin. Sometimes, such a sealing coat is applied to a tablet containing unstable substances such as vitamins, hormones and antibiotics to prevent deterioration. Heretofore, such a sealing coat has consisted of a film-forming material insoluble in water such as shellac, nitrocellulose or polyvinyl acetate. Such a coat is practically insoluble in water and diluted acids, and therefore sufficient thickness of the coat for the elimination of absorption of moisture results in an increase in disintegration time in the gastric juices.

The object of this invention is to provide a new and improved sealing coat for tablets and similar articles which protects their contents from moisture without any increase in disintegration time in the gastric juices.

According to the invention, compressed tablets and similar articles are sealed with a water-insoluble but acid-soluble film-forming polymer selected from the group consisting of polyvinyl diethylaminoacetal, polyvinyl benzylaminoacetal, polyvinyl piperidinoacetal, copolymer of vinyl diethylaminoacetal with vinyl acetate, copolymer of vinyl piperidinoacetal with vinyl acetate, copolymer of N,N-diethylvinylamine with vinyl acetate, copolymer of N-benzyl-vinylamine with vinyl acetate, copolymer of N-hydroxyethylvinylamine with vinyl acetate and copolymer of N-vinylpiperizine with vinyl acetate. Such compounds are described in an article by Tadao Ida appearing in the Journal of the Japan Pharmaceutical Society, vol. 78, pages 655 to 658, and abstracted in Chemical Abstracts, vol. 52, col. 18,227. The coating material of the invention can be applied to materials in the form of granules and/or tablets, from the solutions of one of said polymers in an organic solvent which undergoes no undesired reactions with the polymer to be coated. Especially suitable solvents for this purpose are lower alcohols, chloroform, dioxane and a mixture of chloroform and methanol. Resistance to water of the coated tablets and granules depends upon thickness of the coat. Ordinarily, at least 30 microns of thickness are required to give a sufficient resistance to moisture. Such a thickness of the coating material disintegrates within 20 minutes in the acid medium of the stomach.

The sealed articles of the invention show a high degree of stability in storage. The invention is therefore particularly suitable for use in the manufacture of tablets and similar articles containing unstable active substances such as vitamins, hormones and similar materials. More particularly it is suitable for use in the sealing of compressed tablets and similar articles containing hygroscopic, active materials such as powdered extracts, bile salts, liver extracts and some colloidal materials.

The following examples will serve to indicate and illustrate more specifically the nature of this invention.

*Example 1*

A 1 to 1 mixture of starch and lactose containing 7% of dextrin and 5% of talc is compressed into a tablet of 6.5 mm. diameter, 3 mm. thickness and weighing 120 mg. The compressed tablets are placed in a coating pan. These tablets are given a plurality of coats until the amount of coating of each tablet is as indicated in the table. No dusting powder is employed and the coatings are dried between applications with an air blast at 40° C.

The results of coating with various polymeric materials is as follows:

| | Coating Solution | | Amount of Coating, mg./tablet | Disintegration Time— Distilled Water (hrs.) | Artificial gastric juice (minutes) |
|---|---|---|---|---|---|
| | Solvent | Percent | | | |
| Polyvinyl diethylaminoacetal | $CH_3OH$ | 20 | 10.1 | 4 | 10–20 |
| Polyvinyl benzylaminoacetal | 3:1 $CHCl_3$ $CH_3OH$ | 10 | 9.9 | 4 | 10–20 |
| Polyvinyl piperidinoacetal | $CH_3OH$ | 10 | 10.2 | 4 | 10–20 |
| Copolymer of vinyl diethylaminoacetal with vinyl acetate | dioxane | 10 | 10.2 | 4 | 10–20 |
| Copolymer of vinyl piperidinoacetal with vinyl acetate | $CH_3OH$ | 10 | 10.3 | 4 | 10–20 |
| Copolymer of N,N-diethylvinylamine with vinyl acetate | $CH_3OH$ | 20 | 10.2 | 4 | 10–20 |
| Copolymer of N-hydroxethylvinylamine with vinyl acetate | $CH_3OH$ | 20 | 10.1 | 4 | 10–20 |
| Copolymer of N-vinylpiperidine with vinyl acetate | $CH_3OH$ | 20 | 10.0 | 4 | 10–20 |

*Example 2*

A sealing coat of a copolymer of vinyl piperidinoacetal with vinyl acetate is given to compressed tablets each of which contains 20 mg. of diphenhydramine hydrochloride and weighs 120 mg. in the same manner as described in Example 1. The sealed tablets disintegrate within 10 to 20 minutes in artificial gastric juice and are not attacked in distilled water for more than 4 hours.

The sealed tablets and the original compressed tablets which were not sealed are stored at 37° C. in an atmosphere having 85% relative humidity, the increase in weight of both groups of tablets due to absorption of moisture being measured every 24 hours as follows:

| Day | 1 | 2 | 3 | 4 | 5 |
|---|---|---|---|---|---|
| Tablet: | | | | | |
| Sealed............g.. | 0.01 | 0.01 | 0.01 | 0.01 | 0.01 |
| Not sealed........g.. | 0.36 | 0.78 | 1.05 | 1.32 | 1.35 |

*Example 3*

A sealing coat of the copolymer of vinyl piperidinoacetal with vinyl acetate is applied in the same manner as described in Example 1 to compressed tablets each of which consists of the following formula:

| | Mg. |
|---|---|
| Thiamine hydrochloride | 2.0 |
| Riboflavin | 1.0 |
| Ascorbic acid | 30.0 |
| Niacinamide | 10.0 |
| Starch | 34.0 |
| Lactose | 34.0 |
| Polyvinyl pyrrolidone | 5.0 |
| Lubricant | 4.0 |
| | 120.0 |

Then a plurality of coatings of sugar syrup is applied not only to the sealed tablets, but also to the uncovered tablets by a conventional method until each of the coated tablets reaches 240 mg. of weight. The finished tablets disintegrate within 10 to 20 minutes in artificial gastric juice and are not attacked in distilled water in over 4 hours. Both types of finished tablets are stored in an atmosphere at 37° C. and containing 85% of relative humidity. The percent of the original amount of ascorbic acid remaining in the tablets was as follows:

| Day | 0 | 7 | 15 |
|---|---|---|---|
| Tablet: | | | |
| Sealed percent | 100 | 99.7 | 99.1 |
| Not sealed do | 100 | 65.8 | 30.1 |

*Example 4*

1.0 kg. of ascorbic acid, 4.5 kg. of starch and 4.5 kg. of lactose are thoroughly mixed and then a small amount of a 10% solution of polyvinyl piperidinoacetal in methanol is added. The resulting mass is granulated through a No. 30 mesh screen and dried. 10.0 kg. of the granules is placed in a coating pan. The granules are sprayed with 5.0 kg. of 10% polyvinyl piperidinoacetal solution in methanol, and the coating is dried between applications with an air blast. The sealed granules disintegrate within 10 to 20 minutes in artificial gastric juice and are not attacked in distilled water for more than 4 hours.

I claim:

1. A protective coating for application to material in solid form and adapted for oral ingestion comprising a water insoluble, acid-soluble film-forming material selected from the group consisting of polyvinyl diethylaminoacetal, polyvinyl benzylaminoacetal, polyvinyl piperidinoacetal, copolymers of vinyl diethylaminoacetal with vinyl acetate, copolymers of vinyl piperidinoacetal with vinyl acetate, copolymers of N,N-diethylvinylamine with vinyl acetate, copolymer of N-benzylvinylamine with vinyl acetate, copolymer of N-hydroxyethylvinylamine with vinyl acetate and copolymer of N-vinylpiperizine with vinyl acetate.

2. A medicinal tablet composed of water unstable ingredients having a coating comprising a water insoluble, acid-soluble film-forming material selected from the group consisting of polyvinyl diethylaminoacetal, polyvinyl benzylaminoacetal, polyvinyl piperidinoacetal, copolymers of vinyl diethylaminoacetal with vinyl acetate, copolymers of vinyl piperidinoacetal with vinyl acetate, copolymers of N,N-diethylvinylamine with vinyl acetate, copolymer of N-benzylvinylamine with vinyl acetate, copolymer of N-hydroxyethylvinylamine with vinyl acetate and copolymer of N-vinylpiperizine with vinyl acetate.

References Cited in the file of this patent

Japan Pharmaceutical Society, vol. 78, June 1958, pp. 655–658.

Chemical Abstracts, vol. 52, col. 18, 227.